US012773843B2

(12) United States Patent
Louis et al.

(10) Patent No.: US 12,773,843 B2
(45) Date of Patent: Oct. 27, 2026

(54) FILMS FOR MULTIPLE LAYERS ASSEMBLIES

(71) Applicants: SYENSQO SPECIALTY POLYMERS USA, LLC, Alpharetta, GA (US); Cytec Industries Inc., Princeton, NJ (US)

(72) Inventors: Chantal Louis, Alpharetta, GA (US); James Francis Pratte, Wilmington, DE (US); Mohammad Jamal El-Hibri, Atlanta, GA (US); Yiqiang Zhao, Newark, DE (US)

(73) Assignees: Syensqo Specialty Polymers USA, LLC; Cytec Industries Inc.

( * ) Notice: Subject to any disclaimer, the term of this patent is extended or adjusted under 35 U.S.C. 154(b) by 384 days.

(21) Appl. No.: 18/547,448

(22) PCT Filed: Feb. 22, 2022

(86) PCT No.: PCT/EP2022/054442
§ 371 (c)(1),
(2) Date: Aug. 22, 2023

(87) PCT Pub. No.: WO2022/175558
PCT Pub. Date: Aug. 25, 2022

(65) Prior Publication Data

US 2024/0149575 A1 May 9, 2024

Related U.S. Application Data

(60) Provisional application No. 63/151,822, filed on Feb. 22, 2021.

(30) Foreign Application Priority Data

Jun. 25, 2021 (EP) .................................... 21181639

(51) Int. Cl.

| | |
|---|---|
| ***B32B 27/28*** | (2006.01) |
| ***B32B 5/02*** | (2006.01) |
| ***B32B 5/26*** | (2006.01) |
| ***B32B 27/12*** | (2006.01) |
| ***B32B 27/26*** | (2006.01) |
| ***B32B 37/04*** | (2006.01) |
| ***B32B 37/20*** | (2006.01) |

(52) U.S. Cl.
CPC ............ *B32B 27/288* (2013.01); *B32B 5/022* (2013.01); *B32B 5/26* (2013.01); *B32B 27/12* (2013.01); *B32B 27/26* (2013.01); *B32B 37/04* (2013.01); *B32B 37/203* (2013.01); *B32B 2250/03* (2013.01); *B32B 2250/40* (2013.01); *B32B 2260/023* (2013.01); *B32B 2260/046* (2013.01); *B32B 2262/101* (2013.01); *B32B 2262/106* (2013.01); *B32B 2270/00* (2013.01); *B32B 2307/7376* (2023.05); *B32B 2371/00* (2013.01)

(58) Field of Classification Search
CPC ...... C09J 171/10; C09J 11/04; C09J 2301/20; C09J 2301/304; C09J 7/10; C08L 2205/025; C08L 71/10; C08K 2201/019; C08K 2003/385; C08K 3/38; C08G 2650/40; C08G 65/4012; B32B 2260/40; B32B 2260/021; B32B 2260/023; B32B 2260/046; B32B 2262/101; B32B 2262/103; B32B 2262/106; B32B 2270/00; B32B 2605/08; B32B 2605/18; B32B 2250/03; B32B 2307/7376; B32B 2307/30; B32B 2307/31; B32B 2307/558; B32B 2307/738; B32B 5/022; B32B 5/024; B32B 5/26; B32B 27/12; B32B 27/288; B32B 27/08; B32B 27/18; B32B 27/26; B32B 27/281; B32B 27/285; B32B 27/286; B32B 27/34; B32B 27/36; B32B 27/04; B32B 27/365; B32B 27/1207; B32B 27/203; B32B 27/1223
USPC ............................................................ 442/1
See application file for complete search history.

(56) References Cited

U.S. PATENT DOCUMENTS 5,219,642 A 6/1993 Meakin et al.
5,250,738 A 10/1993 Hackenbruch et al.
5,300,693 A 4/1994 Gilb et al.
(Continued)

FOREIGN PATENT DOCUMENTS

WO 2011001103 A2 1/2011
WO 2015198063 A1 12/2015
(Continued)

OTHER PUBLICATIONS

"Standard Test Method for Transition Temperatures and Enthalpies of Fusion and Crystallization of Polymers by Differential Scanning Calorimetry;" Standard ASTM D3418-12; 2012; pp. 1-7 (7 pages).
(Continued)

*Primary Examiner* — Camie S Thompson
(74) *Attorney, Agent, or Firm* — Osha Bergman Watanabe & Burton LLP

(57) ABSTRACT

The present invention relates to assembly comprising a first component and a second component, each component comprising a polymer, as well as a film positioned between and bonded to the first component and the second component. The film is such that it comprises a blend of at least two poly(ether ketone ketone) (PEKK) polymers and optionally at least one nucleating agent. The assembly has an improved fracture toughness and overall good mechanical properties.

20 Claims, No Drawings

(56) References Cited

U.S. PATENT DOCUMENTS

| | | | |
|---|---|---|---|
| 7,794,823 B2 | 9/2010 | Stecher | |
| 10,012,621 B2 | 7/2018 | Dehmer | |
| 10,150,277 B2 | 12/2018 | Meer | |
| 10,364,349 B1 | 7/2019 | Bertelo et al. | |
| 11,117,311 B2 | 9/2021 | Bheda et al. | |
| 11,458,713 B2 | 10/2022 | Spahr et al. | |
| 2011/0097575 A1* | 4/2011 | Pratte | B29C 70/086 428/221 |
| 2012/0160829 A1 | 6/2012 | Dufaure et al. | |
| 2019/0392964 A1 | 12/2019 | Bihler et al. | |
| 2021/0039369 A1 | 2/2021 | Sinha et al. | |

FOREIGN PATENT DOCUMENTS

| | | | |
|---|---|---|---|
| WO | 2018115033 A1 | 6/2018 | |
| WO | WO-2019002620 A1 * | 1/2019 | C08G 65/40 |

OTHER PUBLICATIONS

"Standard Test Method for Rapid Thermal Degradation of Solid Electrical Insulating Materials By Thermogravimetric Method;" Standard ASTM D3850-19; 2019; pp. 1-5 (5 pages).

International Search Report issued in Application No. PCT/EP2022/054442, mailed on May 12, 2022 (3 pages).

Written Opinion issued in Application No. PCT/EP2022/054442, mailed on May 12, 2022 (6 pages).

* cited by examiner

FILMS FOR MULTIPLE LAYERS ASSEMBLIES

The present application is a national stage entry of PCT/EP2022/054442, filed on 22 Feb. 2022 claims the priority of provisional application U.S. 63/151,822 filed on 22 Feb. 2021 and European patent application EP 21181639.2 filed on 25 Jun. 2021, the content of which being entirely incorporated herein by reference for all purposes. In case of any incoherency between the present application and the PCT application that would affect the clarity of a term or expression, it should be made reference to the present application only.

TECHNICAL FIELD

The field of the invention is the field of polymer composites. The present invention relates to assembly comprising a first component and a second component, each component comprising a polymer, as well as a film positioned between and bonded to the first component and the second component. The film is such that it comprises a blend of at least two poly(ether ketone ketone) (PEKK) polymers having different T/I ratios. The assembly can notably be used to prepare parts and articles for the aerospace and automotive industries.

BACKGROUND ART

Within many industries, in particular the aerospace industry, considerable use is made of laminates, composites and other assemblies comprising multiple layers of different materials, each material contributing specific properties to the final assembly. It has often proven to be challenging to achieve satisfactory adhesion or bonding directly between the dissimilar layers that may need to be utilized in a composite or laminate. Poor compatibility between composite layers can limit the properties exhibited by such assemblies. In particular, certain thermoplastic polymers (particularly crystalline and/or high temperature thermoplastics) exhibit poor adhesion to other materials, leading to problems with delamination and loss of structural integrity when the assembly is placed in use in a highly demanding environment.

A number of techniques have been proposed to secure and/or bond thermoplastic components together. In particular, many different welding processes, such as ultrasonic welding, induction welding and hot-plate welding, have been proposed for securing first and second thermoplastics components together. However, local melting of the first and second parts in the region of the weld may affect the integrity and/or shape of the parts. It may also lead to distortion due to residual stress build-up in the parts during the melting and/or cooling of the thermoplastic in the region of the weld.

In order to address some of the problems associated with welding processes, it has been proposed to provide a film and/or adhesive between parts and/or layers to bond them together.

WO 2011/001103A2 describes the use of an amorphous poly(ether ketone ketone) (PEKK) film as a tie layer in assemblies such as composites and laminates. However, given the amorphous nature of the film, it is not deemed suitable for use in structural applications in the aerospace industry. As a general point, the use of amorphous materials as bonding layer in a composite may represent the weakest part of the structure, where properties such as solvent resistance are relatively low. Thus, the joint may be prone to attack by fluids leading to premature failure of the structure.

WO 2015/198063A1 discloses the use of a polymeric material which comprises a PEEK-PEDEK polymer, that is a polymer having a repeat unit of formula $$—O—Ph—O—Ph—CO—Ph— \qquad \text{I}$$

and a repeat unit of formula $$—O—Ph—Ph—O—Ph—CO—Ph— \qquad \text{II}$$

wherein Ph represents a phenylene moiety, as an adhesive between a first part and a second part comprising polyaryletherketone polymers, in particular PEEK. The mechanical properties of PEEK-PEDEK polymers are however not as good as those of other polyaryletherketone polymers.

US 2021/039369 discloses a structure comprising a polyetheretherketone (PEEK) and carbon fiber and does not disclose a PEKK polymer. WO 2018/115033 does not disclose the assembly of claim 1 nor the blend of PEKKs of the invention.

TECHNICAL PROBLEM

There is a need of a film which is capable of bonding strongly together two components (or parts) made of polymers, so as to prepare an assembly presenting improved chemical resistance and improved mechanical properties. The film should be processed at a temperature lower than the melting temperature of the two components to be bound, and advantageously at a temperature lower than 340° C.

The invention aims at solving this technical problem.

BRIEF DESCRIPTION OF THE INVENTION

The invention is set out in the appended set of claims. An object of the invention is thus an assembly as defined in the claims herein.

Another object of the invention is a method for making an assembly as defined in any one of claims herein.

Another object is the composition comprising the blend of PEKK1, PEKK2 and optionally at least one nucleating agent.

More precisions and details about these objects are now provided below.

DISCLOSURE OF THE INVENTION

The present invention is in the field of laminates, composites and other assemblies comprising multiple layers of different materials, each material contributing specific properties to the assembly. These assemblies comprise at least two components which may be the same or different, as well as at least one film, which is sometimes referred to herein as a "bonding film".

The films used described in the present disclosure present a set of properties which make them well-suited to bond polymeric components in assembly structure, in particular in assembly structures made of poly(aryl ether ketone) (PAEK) polymers. These films comprise a blend of at least two poly(ether ketone ketone) (PEKK) polymers (PEKK1, PEKK2), wherein the PEKK1 and PEKK2 differ from each other in that they have distinct molar T/I ratios (also called herein indifferently molar ratios of recurring units (P) to recurring units (M)). This PEKK blend presents a crystallinity which makes it well-adapted to assembly structure where there is a need for chemical resistance and mechanical properties, as it is the case of composite structures in the aerospace industry.

A PEKK polymer is known to be characterized by a T/I ratio which is the molar ratio of the terephthaloyl (T) to isophthaloyl (I) moieties that are present in the polymer.

The films described herein are advantageously compatible with the polymeric components to be bound.

In the present application:

- any description, even though described in relation to a specific embodiment, is applicable to and interchangeable with other embodiments of the present disclosure;
- where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and
- any recitation herein of numerical ranges by endpoints includes all numbers subsumed within the recited ranges as well as the endpoints of the range and equivalents.

A first object of the invention is an assembly comprising:

- a first component comprising a polymer (P1),
- a second component comprising a polymer (P2) and
- a film positioned between and bonded to the first component and the second component, wherein the film comprises a blend of at least two poly(ether ketone ketone) (PEKK) polymers (PEKK1, PEKK2), wherein the PEKK polymers comprise at least 50 mol. % of recurring units of formulas (M) and (P), the mol. % being based on the total number of moles in the polymer:

(P)

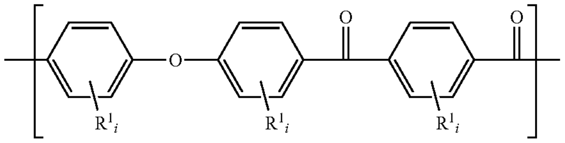

(M)

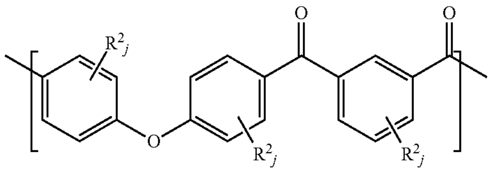

wherein

- $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
- i and j, at each instance, is an independently selected integer ranging from 0 to 4;

wherein the PEKK1 and PEKK2 differ from each other in that they have distinct molar ratios of recurring units (P) to recurring units (M) (also called T/I ratios).

The two PEKKs are prepared by a specific method which provides certain characteristics that will be detailed below and make it possible to solve the technical problem.

In the context of the present invention, the term “bonded” means that the components are attached to one another or to each other, preferably permanently.

The film of the assembly may additionally comprise at least one nucleating agent.

The film may also comprise scrim(s) and/or non-woven reinforcement(s) and/or lightweight fabric(s), which help to regulate the melt flow and/or provide a uniform surface to bond to, as well potentially influencing the local morphology in the bond line.

The assembly of the invention may also comprise further components (third, fourth, fifth, . . . ) and films, depending on the composite part to be built. For example, the assembly of the invention may comprise a third component comprising a polymer (P3) and a film between the second and third component, wherein this additional film binds the second and third components together.

PEKK Polymers (PEKK1, PEKK2)

The poly(ether ketone ketone) (PEKK) polymers described herein are such that they comprise at least 50 mol. % of recurring units of formulas (M) and (P), the mol. % being based on the total number of moles in the polymer:

(P)

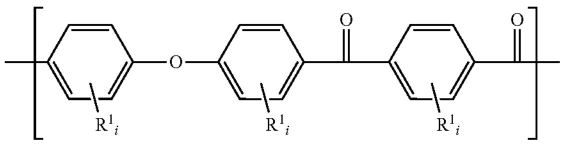

(M)

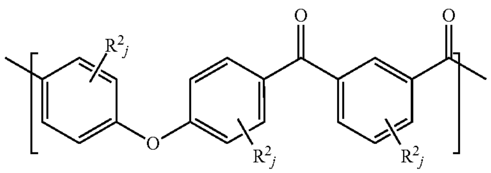

wherein

- $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
- i and j, at each instance, are independently selected integers ranging from 0 to 4.

According to an embodiment, $R^1$ and $R^2$ are, at each location in formula (P) and (M) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment of the present disclosure, at least 55 mol. %, at least 60 mol. %, at least 70 mol. %, at least 80 mol. %, at least 90 mol. %, at least 95 mol. %, at least 99 mol. % or all of the recurring units in at least one of the PEKK polymers (PEKK1, PEKK2) in the film, preferably in both PEKK1 and PEKK2, are recurring units of formulae (M) and (P).

In an embodiment, substantially all of the recurring units in at least one of the PEKK polymers (PEKK1, PEKK2), preferably in both PEKK1 and PEKK2, are recurring units of formulae (M) and (P). In an embodiment, the recurring units of at least one of the PEKK polymers (PEKK1, PEKK2), preferably of both PEKK1 and PEKK2, consist of recurring units of formulae (M) and (P).

According to another preferred embodiment, i and j are zero for each $R^1$ and $R^2$ group. According to this embodiment, at least one of the PEKK polymers (PEKK1, PEKK2) in the film, preferably both PEKK1 and PEKK2, comprise(s) at least 50 mol. % of recurring units of formulas (M') and (P'), the mol. % being based on the total number of moles in the polymer:

(P')

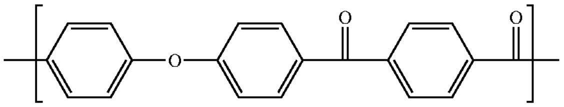

(M')

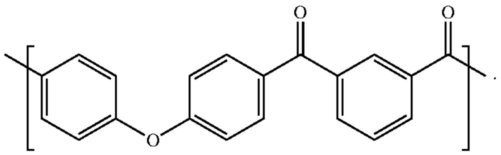

According to an embodiment of the present disclosure, at least 55 mol. %, at least 60 mol. %, at least 70 mol. %, at least 80 mol. %, at least 90 mol. %, at least 95 mol. %, at least 99 mol. % or all of the recurring units in at least one of the PEKK polymers (PEKK1, PEKK2) in the film, preferably in both PEKK1 and PEKK2, are recurring units of formulae (M') and (P').

In an embodiment, substantially all of the recurring units in at least one of the PEKK polymers (PEKK1, PEKK2), preferably in both PEKK1 and PEKK2, are recurring units of formulae (M') and (P'). In an embodiment, the recurring units of at least one of the PEKK polymers (PEKK1, PEKK2), preferably of both PEKK1 and PEKK2, consist of recurring units of formulae (M') and (P').

According to the present invention, the molar ratio of recurring units (P) to recurring units (M) of PEKK1 (also called herein "T/I ratio of PEKK1") differs from the molar ratio of recurring units (P) to recurring units (M) of PEKK2 (T/I ratio of PEKK2).

In some embodiments, the T/I molar ratio of PEKK1 is:

at least 50/50, preferably at least 54/46, more preferably at least 56/44, most preferably at least 57/43, and/or at most 64/36, preferably at most 63/37, more preferably at most 62/38.

The T/I molar ratio of PEKK1 is suitably between 50/50 and 64/36.

In some embodiments, the T/I molar ratio of PEKK2 is:

at least 65/35, preferably at least 66/34, more preferably at least 67/33, and/or at most 85/15, preferably at most 83/17, more preferably at most 82/18.

The T/I molar ratio of PEKK2 is suitably between 65/35 and 85/15.

In some embodiments, the assembly film is such that the weight ratio of PEKK1 to PEKK2 in the film is at least 65/35, more preferably at least 70/30, even more preferably at least 75/25 and/or it is of at most 99/1, preferably of at most 97/3, even more preferably at most 96/4.

The weight ratio PEKK1/PEKK2 is suitably between 65/35 and 99/1. The weight ratio may suitably be between 80/20 and 99/1 or between 90/10 and 99/1.

In some embodiments, the assembly film is such that PEKK1 represents from 50 to 95 wt. % of the PEKK blend, for example from 60 to 90 wt. %, or from 70 to 85 wt %.

According to an embodiment of the present disclosure, at least one the PEKK polymers (PEKK1, PEKK2) in the film, or preferably the PEKK blend, described herein has a melt temperature Tm ranging from 270 to 340° C., preferably from 280 to 330° C., as measured by differential scanning calorimetry (DSC) according to ASTM D3418. Tm is more preferably from 280 to 320° C., most preferably from 280 to 310° C.

More particularly, Tm is measured by DSC according to ASTM D3418 and using a heating and cooling rate of 10° C./min. Tm is determined on the $2^{nd}$ heat scan. The following cycle can be followed:

$1^{st}$ heat cycle: 30.00° C. to 400.00° C. at 10.00° C./min, isothermal at 400.00° C. for 1 min;

$1^{st}$ cool cycle: 400.00° C. to 30.00° C. at 10.00° C./min, isothermal for 1 min;

$2^{nd}$ heat cycle: 30.00° C. to 400.00° C. at 10.00° C./min, isothermal at 400.00° C. for 1 min.

According to an embodiment of the present disclosure, the PEKK polymer blend employed in the film described herein is such that heat of fusion ΔHf meets the following equation:

$$\Delta H_f > 1.69 \times T_m - 480 \quad \text{(eq 1)}$$

wherein:

Tm is the PEKK melting temperature in ° C. and $\Delta H_f$ is in J/g.

Such equation is an empirical equation that, in the context of the present invention, differentiates a blend of acceptable crystallinity for a given melting temperature (Tm) from a blend of non-acceptable crystallinity at the same Tm.

According to an embodiment of the present disclosure, the PEKK polymer blend employed in the film described herein is such that heat of fusion ΔHf is at least 5.0 J/g, at least 6.0 J/g or at least 7.0 J/g.

More particularly, the heat of fusion measured by DSC on the $2^{nd}$ heat scan according to ASTM D3418 and using a heating and cooling rate of 10° C./min. The following cycle can be followed:

$1^{st}$ heat cycle: 30.00° C. to 400.00° C. at 10.00° C./min, isothermal at 400.00° C. for 1 min;

$1^{st}$ cool cycle: 400.00° C. to 30.00° C. at 10.00° C./min, isothermal for 1 min;

$2^{nd}$ heat cycle: 30.00° C. to 400.00° C. at 10.00° C./min, isothermal at 400.00° C. for 1 min.

Synthesis of the PEKK Polymers

The synthesis of PEKK polymers is described in the literature and typically comprises a step of polycondensing the monomers in a solvent, in order to obtain the PEKK polymer, and a step of extracting the solvent and the salts.

In a preferred embodiment of the present invention, the polycondensation of the monomers takes place in the absence of a Lewis acid or takes place in the presence of an amount of Lewis acid of less than 2 wt. %, based on the total weight of the monomers, preferably less than 1 wt. %, more preferably less than 0.5 wt. %.

In the context of the present invention, the Lewis acid may be defined as selected from the group consisting of $BF_3$, $AlCl_3$, $FeCl_3$, $CF_3SO_3H$ and $CH_3SO_3H$.

In a preferred embodiment, the synthesis of the PEKK polymer, comprises: Step a) polycondensing in a solvent, in the absence of a Lewis acid or in the presence of an amount of Lewis acid of less than 2 wt. %, based on the total weight of the monomers, preferably less than 1 wt. %, more preferably less than 0.5 wt. %, the following monomers (P—OH), (M-OH), (P—F) and/or (M-F):

(P-OH)

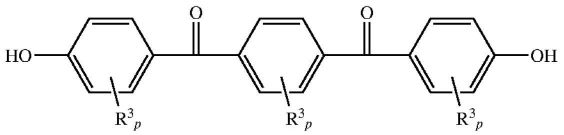

(M-OH)

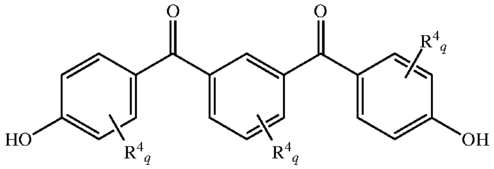

(P-F)

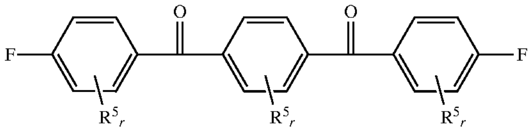

(M-F)

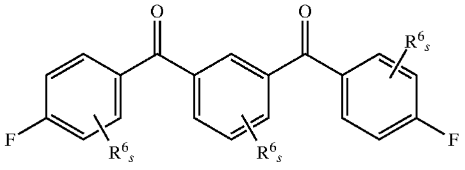

wherein $R^3$, $R^4$, $R^5$ and $R^6$, at each instance, are independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

p, q, r and s, at each instance, are independently selected from 0 to 4;

wherein the molar ratio of moles of (P—OH) and (M-OH) to moles of (P—F) and (M-F) is such that:

$$0.90 \leq \frac{n_{(P-F)} + n_{(M-F)}}{n_{(P-OH)} + n_{(M-OH)}} \leq 1.10$$

preferably the molar ratio is ≥ to 0.985, ≥ to 0.990 or ≥ to 0.995, preferably the molar ratio is ≤ to 1.015, to ≤ 1.010 or ≤ to 1.005, Step b) extracting the solvent and the salts, in order to obtain a powder.

Preferably, p=q=r=s=0.

The method described above produces a PEKK powder having a low volatiles content. According to an embodiment, the PEKK polymer has a Td(1%) of at least 500° C., preferably 505° C., more preferably 510° C., as measured by thermal gravimetric analysis according to ASTM D3850, heating from 30° C. to 800° C. under nitrogen using a heating rate of 10° C./min. Td(1%) represents the temperature at which a determined amount of volatile materials (=1.0 wt. %) have left the sample.

In an embodiment, $R^3$, $R^4$, $R^5$ and $R^6$ are, at each location in formulas (P—OH), (P—F), (M-OH) and (M-F) above, are independently selected from the group consisting of a C1-C12 moiety optionally comprising one or more than one heteroatoms; sulfonic acid and sulfonate groups; phosphonic acid and phosphonate groups; amine and quaternary ammonium groups.

The T/I ratio is controlled by the amounts of (P—F)+(P—OH) and of (M-F)+(M-OH).

According to a preferred embodiment, the polycondensation leading to the PEKK polymer involves only the following monomers: (P—OH), (M-OH) and (P—F).

Step a): the polycondensation of step a) is based on a nucleophilic substitution. The polycondensation takes place in a solvent such as DPS in the presence of a salt at least one base selected in the group of $Na_2CO_3$, $K_2CO_3$ or a combination thereof. The temperature of step a) is usually between 250° C. and 350° C., more particularly between 300° C. and 350° C.

The amount of base(s) should preferably be enough to activate all the OH groups of the monomers. The amount of bases is usually slightly higher than the amount of OH groups. A molar excess between 1.0 and 5.0% may be used.

According to an embodiment, the base(s) is/are added to a mixture comprising the solvent and the monomers, the mixture being preferably at a temperature higher than 250° C., notably between 250° C. and 350° C. The duration of the introduction of the base(s) may be between 10 min and 120 min, preferably between 30 and 90 min.

According to another preferred embodiment, at the end of the polycondensation, monomer (P—F) and/or (M-F), preferably (P—F), is/are added to the mixture. This ensures that the PEKK polymer contains fluorine-end groups.

In step b), the polymer obtained in step a) is treated so as to remove the solvent and the salts. For instance, step b) may be performed by contacting the polymer with a liquid selected in the group of water, alcohols, ethers, ketones and a combination thereof. The liquid may conveniently be a mixture of water and a liquid selected in the group of water, alcohols, ethers, ketones and a combination thereof. The liquid may also comprise an acid or a base.

The synthesis approach may involve a step of contacting the PEKK, preferably washing the PEKK, with a solution of at least one of sodium dihydrogen phosphate ($NaH_2PO_4$), disodium hydrogen phosphate ($Na_2HPO_4$), potassium dihydrogen phosphate ($KH_2PO_4$) and dipotassium hydrogen phosphate ($K_2HPO_4$), or mixture thereof. For example, the PEKK may be contacted (e.g. washed) with a solution, e.g. and aqueous solution, including both $NaH_2PO_4$ and $Na_2HPO_4$. The phosphate salts used of the solutions used hereby can for example be anhydrous, monohydrate, dihydrate or heptahydrate.

In addition to the step of contacting the PEKK polymer with a solution of at least one of sodium dihydrogen phosphate ($NaH_2PO_4$), disodium hydrogen phosphate ($Na_2HPO_4$), potassium dihydrogen phosphate ($KH_2PO_4$) and dipotassium hydrogen phosphate ($K_2HPO_4$), or mixture thereof, the synthesis approach may also involve at least one step of contacting the PEKK, preferably washing the PEKK, with a solution including an acid or base in an amount sufficient to neutralize the PEKK polymer.

Suitable acids and bases include any organic or inorganic acid or base that exhibits a solubility of at least 0.1 wt. % in organic solvents such as alcohols, ketones, amides, aromatic hydrocarbons or in water at temperatures below the boiling point of the solvent. Preferably, the solvent has a boiling point of at most 250° C., more preferably at most 150° C. and most preferably at most 100° C. The acids preferably have a $pK_a$ ranging from 3.0 to 7.5, and the bases preferably have a $pK_b$ ranging from −1.0 to 8.0.

In some embodiments, the acid is selected from acetic acid, mono alkali metal citrates and combinations thereof.

In some embodiments, the base is selected from organic amines, tetraalkylammonium hydroxide, tetraalkylammonium acetate, tetraalkylphosphonium hydroxide, tetraalkylphosphonium acetate, alkali or alkaline earth metal hydroxides, alkali or alkaline earth metal monohydrogenphosphates, alkali or alkaline earth metal phosphates, and combinations thereof.

The preferred solvent is water, alcohol, ether, or ketones with boiling point of at most 150° C.; however, any solvent capable of dissolving at least 0.1 wt. % of the acid or base, and which does not adversely react with the PEKK polymer, may be used. Preferably the solvent is water, methanol, ethanol, propanol, or isopropanol. More preferably the solvent is water, methanol, or ethanol. In some embodiments, more than one solvent can be used.

The PEKK polymer may be more particularly prepared according to the recipes disclosed in examples 1-2, the T/I ratio being modified and adapted by variation of the quantities of monomers used for the polycondensation (see Tables 1 and 1').

The method of preparation disclosed herein, either generally or according to the specific embodiments disclosed, makes it possible to obtain a specific PEKK1 and PEKK2 having one or more of the following properties:

- the PEKK polymer contains fluorine in an amount generally higher than 100 ppm, preferably higher than 200 ppm, even more preferably higher than 300 ppm. Such polymer-bound fluorine is the inevitable fingerprint of the use of fluorine-containing monomers;
- the PEKK polymer is substantially free of aluminium. The amount of Al in the PEKK polymer is generally below 50 ppm, preferably below 25 ppm, more preferably below 10 ppm;
- the PEKK polymer has a Td(1%) of at least 500° C., preferably of at least 505° C., more preferably of at least 510° C., as measured by thermal gravimetric analysis according to ASTM D3850, with a heating from 30° C. to 800° C. under nitrogen using a heating rate of 10° C./min.

The Al and F contents are conveniently determined by elemental analysis, such as ICP-OES analysis for Al and Combustion-ion chromatography for fluorine.

Nucleating Agent(s)

According to the present invention, the film may further comprise at least one nucleating agent. The nucleating agent may be selected from the group consisting of boron-containing compounds (e.g., boron nitride, sodium tetraborate, potassium tetraborate, calcium tetraborate, etc.), alkaline earth metal carbonates (e.g., calcium magnesium carbonate), oxides (e.g., titanium oxide, aluminum oxide, magnesium oxide, zinc oxide, antimony trioxide, etc.), silicates (e.g., talc, sodium-aluminum silicate, calcium silicate, magnesium silicate, etc.), salts of alkaline earth metals (e.g., calcium carbonate, calcium sulfate, etc.), nitrides and so forth. The nucleating agent can also be carbon based. Nucleating agents in this category includes graphite, graphene, graphitic nanoplatelets and graphene oxide. It can also be a carbon black as well as other forms of carbon.

Particularly good results have been obtained when the nucleating agent was boron nitride.

The proportion of nucleating agent(s) is generally lower than 2.0 wt. %, even lower than 1.5 wt. %, this proportion being relative to the weight of the PEKK polymers. This proportion is usually higher than 0.1 wt. %, even higher than 0.5 wt. %. This proportion is usually between 0.5 and 2.0 wt % or between 0.5 and 1.5 wt. %.

Other Additives

In some embodiments, the film comprises at least one additive, as further component other than the PEKK polymer(s) and optionally the nucleating agent(s). Suitable additives include, but are not limited to, (i) colorants such as dyes (ii) pigments such as titanium dioxide, zinc sulfide and zinc oxide (iii) light stabilizers, e.g., UV stabilizers, (iv) heat stabilizers, (v) antioxidants such as organic phosphites and phosphonites, (vi) acid scavengers, (vii) processing aids, (ix) internal lubricants and/or external lubricants, (x) flame retardants, (xi) smoke-suppressing agents, (x) anti-static agents, (xi) anti-blocking agents, (xii) conductivity additives such as carbon black and carbon nanofibrils, (xiii) plasticizers, (xiv) flow modifiers, (xv) extenders, (xvi) metal deactivators and (xvii) flow aids such as silica. The film may comprise at one additive, two, three or several additives of the same category or of different categories as listed above, for example one heat stabilizer and one pigment.

According to these embodiments, the amount of such additive(s) is less than 20 wt. %, preferably less than 10 wt. %, more preferably less than 5 wt. % and even more preferably less than 2 wt. % of additives, most preferably less than 1 wt. %, based on total weight of the film.

In another embodiment, the film is free of any filler, or contains less than 0.5 wt. %, preferably less than 0.1 wt. % of any filler.

In another embodiment, the film is free of any filler, but contains "reinforcing fibrous fibers", as described below, such as scrims, nonwowens or lightweight fabrics. The term "reinforcing fibrous fibers" may include one or more fibrous materials adapted for the reinforcement of composite structures, i.e., a "reinforcing fiber". The term "fiber" is used herein to refer to fibers, organic and/or inorganic, that have a length of at least 0.5 mm.

As described herein, the film comprises a polymeric component, which is a blend of at least two PEKK polymers, as well as optionally at least one nucleating agent. As used herein, the term "polymeric component" means a compound having repeat units and a molecular weight of at least 2,000 g/mol.

In some embodiments, the PEKK polymers, as above detailed, are the only polymeric component in the film.

In some other embodiments, the polymeric component of the film comprises a blend of more than the two PEKK polymers described herein, for example a blend of distinct polymers.

For example, the polymeric component of the film may consist in a blend of PEKK1, PEKK2 and one additional distinct polymer, wherein at least 60 wt. % of the polymeric component consists in the PEKK blend as described above, and less than 40 wt. % consists in at least one polymer distinct from the PEKK blend described above. As another example, the polymeric component of the film consists in at least 70 wt. % of the PEKK blend described above, and less than 30 wt. % of at least one polymer distinct from the PEKK blend described above. As another example yet, the polymeric component of the film consists in at least 80 wt. % of the PEKK blend described above, and less than 20 wt. % of at least one polymer distinct from the PEKK blend described above. As another example, the polymeric component of the film consists in at least 90 wt. % of the PEKK blend described above, and less than 10 wt. % of at least one polymer distinct from the PEKK blend described above.

In some embodiments, the polymeric component of the film comprises less than 3 wt. %, less than 2 wt. %, less than 1 wt. %, or less than 0.5 wt. % of a polymer distinct from the PEKK blend described above.

Such distinct polymer may be selected from the group consisting of poly(aryl ether sulfone) (PAES) polymers and poly(aryl ether ketone) (PAEK) polymers. When the additional polymer component is a PAES polymer, it may be selected from the group consisting of a polysulfone (PSU), a polyphenylsulfone (PPSU), and a poly(ether sulfone) (PES). When the additional polymer component is a PAEK polymer, it may be advantageously selected from the group consisting of a poly(ether ether ketone) (PEEK) polymer, a poly(ether ketone ketone) (PEKK) polymer, a poly(etherketone) (PEK), a poly(ether ketone ether ketone ketone) (PEKEKK), a PEEK-PEDEK copolymer. The additional polymer component may also be a polyimide, such as polyetherimide (PEI) or poly(amideimide) (PAI).

In certain embodiments, the film comprises at least 90 wt. % of the PEKK blend and at least one additive. Most preferably, the film comprises at least 95 wt. %, preferably at least 98 wt. % of the PEKK blend and at least one additive, based on the total weight of the film.

Scrim, Nonwoven and Lightweight Reinforcement

The film of the assembly may additionally comprise scrim(s) and/or nonwoven reinforcement(s) and/or lightweight fabric(s), which help to regulate the melt flow and/or provide a uniform surface to bond to, as well potentially influencing the local morphology in the bond line.

The film described herein may advantageously include a scrim, or a scrim layer. The scrim may be made of natural wovens, synthetic wovens, nonwovens, knits (including without limitation weft insertion knits) or plastics.

The film described herein may also advantageously include a nonwowen, also called a nonwowen fabric or fiber web.

Such scrims, nonwowens or lightweight fabrics are advantageous as they help maintaining an uniform bondline thickness.

Process to Prepare the Film

The film described herein may have a thickness ranging from 15 to 800 μm, from 25 to 600 μm, preferably from 30 to 500 μm, more preferably from 40 to 300 μm, most preferably from 50 to 250 μm.

The film described may be prepared by any conventional method known in the art of polymer processing. For example, the components of the film can be processed in the form of a film by cast extrusion, optionally with mono-or bi-axial orientation.

In some embodiments, the method of making the film includes melt compounding a physical mixture of the components of the film. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

In some embodiments, the physical mixture is compounded in an extruder and then chopped into pellets or granules. The granules or pellets can then be further processed to manufacture the film.

Alternatively, the physical mixture is compounded in an extruder and then directly formed into a film. A technique particularly adapted to the manufacture of the films involves extruding the molten composition through a die having elongated shape so as to obtain an extruded tape and casting/calendering said extruded tape so as to obtain a film. The tape can be calendered into a film by passing through appropriate rolls, which can be maintained at appropriate temperatures, and whose speed can be adjusted so as to achieve the required thickness. The thickness of the film is adjusted at the die. The film can be either amorphous or semicrystalline in its finished (extruded) form, depending on the cooling temperatures utilized to solidify the film.

According to an embodiment, the ingredients of the film are put into contact in a solvent of PEKK such as DPS and the mixture is stirred at a temperature at which the polymers dissolve totally or partly in the solvent. The solvent is then extracted for instance with the method already disclosed above. The solution blending disclosed in the examples illustrates this embodiment.

In an advantageous embodiment, the film is a monolayer film, i.e. it consists of only one layer comprising a PEKK blend.

When the film comprises a scrim, a nonwowen or a lightweight fabric, these reinforcing layers or fabric reinforcements may be impregnated with the PEKK polymer blend by a variety of methods, such as APC process, slurry impregnation process or film lamination. For example, the process may comprise:

- impregnating the fabric in a liquid medium, comprising the PEKK blend component in the shape of polymer powder particles, at least an aqueous solvent and at least one surfactant,
- heating the impregnated fabric above the melting temperature of the PEKK, and
- shaping the fabric, for example using at least one die of specific geometry.

Polymers (P1) and (P2)

The expression "first component comprising a polymer (P1)" is used herein to refer to a component having at least one surface, notably the surface in contact with the bonding film, comprising a polymer (P1). First component may consist of said polymer (P1). Alternatively, first component comprises one surface comprising polymer (P1). The surface comprising polymer (P1) typically has a thickness suitable to form a bond with the bonding film. Said thickness may conveniently be equal to or greater than 5 μm.

The expression "second component comprising a polymer (P2)" is used herein to refer to a component having at least one surface, notably the surface in contact with the bonding film, comprising a polymer (P2). Second component may consist of said polymer (P2). Alternatively, second component comprises one surface comprising polymer (P2). The surface comprising polymer (P2) typically has a thickness suitable to form a bond with the bonding film. Said thickness may conveniently be equal to or greater than 5 μm.

Polymer (P1) and polymer (P2) may be the same or distinct.

Polymer (P1) and polymer (P2) may independently be selected from the group consisting of crystalline and/or high temperature thermoplastic polymers. Non-limiting examples include, but are not limited to, poly(aryl ether ketones) (PAEK), poly(etherimides) (PEI), poly(amide imides) (PAI), poly(aryl ether sulfones) (PAES), poly(arylene sulphides) (PAS), poly(phthalamides) (PPA), polyamides (PA), polycarbonates (PC), liquid crystal polymers (LCP), poly(aromatic esters) (PAE) and blends thereof.

In a preferred embodiment, polymer (P1) and polymer (P2) are independently selected from the group consisting of PAEK and blends of PAEK. The PAEK can for example be selected from the group consisting of a poly(ether ether ketone) (PEEK) polymer, a PEEK copolymer, a poly(ether ketone ketone) (PEKK) polymer, a poly(etherketone) (PEK) and a poly(ether ketone ether ketone ketone) (PEKEKK). The PEEK copolymer can for example be a PEEK-PEDEK copolymer.

Poly(Aryl Ether Ketone) (PAEK)

As used herein, a poly(aryl ether ketone) (PAEK) denotes any polymer comprising recurring units ($R_{PAEK}$) comprising a Ar'—C(=O)—Ar* group, where Ar' and Ar*, equal to or different from each other, are aromatic groups, the mol. % being based on the total number of moles of recurring units in the polymer. The recurring units ($R_{PAEK}$) are selected from the group consisting of units of formulas (J-A) to (J-D) below:

(J-A)

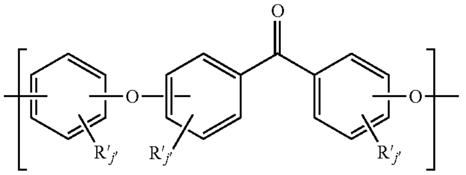

(J-B)

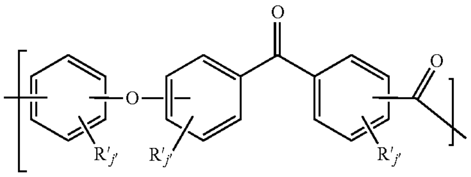

(J-C)

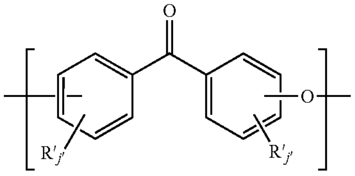

(J-D)

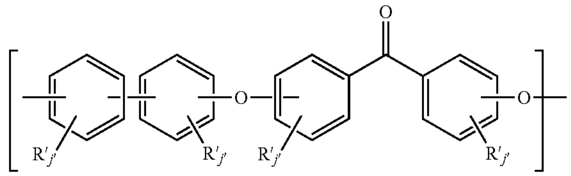

where

R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j' is independently zero or an integer ranging from 1 to 4.

In recurring unit ($R_{PAEK}$), the respective phenylene moieties may independently have 1,2-, 1,4- or 1,3-linkages to the other moieties different from R' in the recurring unit ($R_{PAEK}$). Preferably, the phenylene moieties have 1,3- or 1,4-linkages, more preferably they have a 1,4-linkage.

In recurring units ($R_{PAEK}$), j' is preferably at each location zero so that the phenylene moieties have no other substituents than those linking the main chain of the polymer.

According to an embodiment, the PAEK is a poly(ether ether ketone) (PEEK).

As used herein, a poly(ether ether ketone) (PEEK) denotes any polymer comprising recurring units ($R_{PEEK}$) of formula (J-A), based on the total number of moles of recurring units in the polymer:

(J-A)

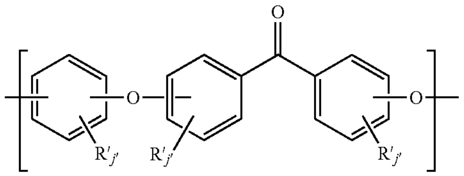

where

R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and j', for each R', is independently zero or an integer ranging from 1 to 4 (for example 1, 2, 3 or 4).

According to formula (J-A), each aromatic cycle of the recurring unit ($R_{PEEK}$) may contain from 1 to 4 radical groups R'. When j' is 0, the corresponding aromatic cycle does not contain any radical group R'.

Each phenylene moiety of the recurring unit ($R_{PEEK}$) may, independently from one another, have a 1,2-, a 1,3- or a 1,4-linkage to the other phenylene moieties. According to an embodiment, each phenylene moiety of the recurring unit ($R_{PEEK}$), independently from one another, has a 1,3- or a 1,4-linkage to the other phenylene moieties. According to another embodiment yet, each phenylene moiety of the recurring unit ($R_{PEEK}$) has a 1,4-linkage to the other phenylene moieties.

According to an embodiment, R' is, at each location in formula (J-A) above, independently selected from the group consisting of a C1-C12 moiety, optionally comprising one or more than one heteroatoms; sulfonic acid and sulfonate groups; phosphonic acid and phosphonate groups; amine and quaternary ammonium groups.

According to an embodiment, j' is zero for each R'. In other words, according to this embodiment, the recurring units ($R_{PEEK}$) are according to formula (J'-A):

(J'-A)

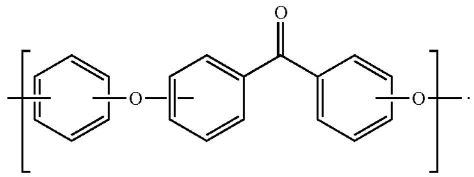

According to another embodiment of the present disclosure, a poly(ether ether ketone) (PEEK) denotes any polymer comprising at least 10 mol. % of the recurring units are recurring units ($R_{PEEK}$) of formula (J-A"):

(J"-A)

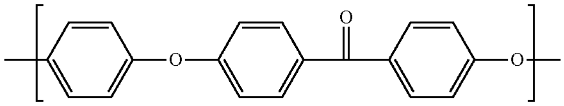

the mol. % being based on the total number of moles of recurring units in the polymer.

According to an embodiment of the present disclosure, at least 10 mol. % (based on the total number of moles of recurring units in the polymer), at least 20 mol. %, at least 30 mol. %, at least 40 mol. %, at least 50 mol. %, at least 60 mol. %, at least 70 mol. %, at least 80 mol. %, at least 90 mol. %, at least 95 mol. %, at least 99 mol. % or all of the recurring units in the PEEK are recurring units ($R_{PEEK}$) of formulas (J-A), (J'-A) and/or (J"-A).

The PEEK polymer can therefore be a homopolymer or a copolymer. If the PEEK polymer is a copolymer, it can be a random, alternate or block copolymer.

When the PEEK is a copolymer, it can be made of recurring units ($R^*_{PEEK}$), different from and in addition to recurring units ($R_{PEEK}$), such as recurring units of formula (J-D):

(J-D)

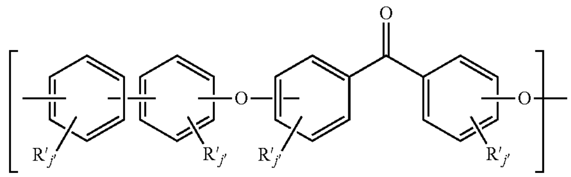

where

- R', at each location, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
- j', for each R', is independently zero or an integer ranging from 1 to 4.

According to formula (J-D), each aromatic cycle of the recurring unit ($R^*_{PEEK}$) may contain from 1 to 4 radical groups R'. When j' is 0, the corresponding aromatic cycle does not contain any radical group R'.

According to an embodiment, R' is, at each location in formula (J-D) above, independently selected from the group consisting of a C1-C12 moiety, optionally comprising one or more than one heteroatoms; sulfonic acid and sulfonate groups; phosphonic acid and phosphonate groups; amine and quaternary ammonium groups.

According to an embodiment, j' is zero for each R'. In other words, according to this embodiment, the recurring units ($R^*_{PEEK}$) are according to formula (J'-D):

(J'-D)

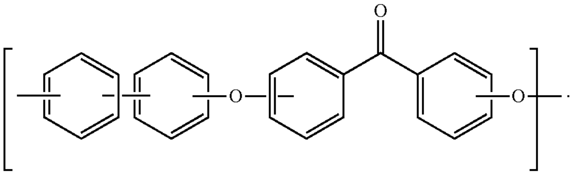

According to another embodiment of the present disclosure, the recurring units ($R^*_{PEEK}$) are according to formula (J"-D):

(J"-D)

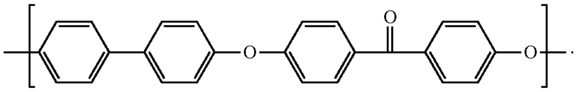

According to an embodiment of the present disclosure, less than 90 mol. % (based on the total number of moles of recurring units in the polymer), less than 80 mol. %, less than 70 mol. %, less than 60 mol. %, less than 50 mol. %, less than 40 mol. %, less than 30 mol. %, less than 20 mol. %, less than 10 mol. %, less than 5 mol. %, less than 1 mol. % or all of the recurring units in the PEEK are recurring units ($R^*_{PEEK}$) of formulas (J-D), (J'-D), and/or (J"-D).

According to an embodiment, the PEEK polymer is a PEEK-PEDEK copolymer. As used herein, a PEEK-PEDEK copolymer denotes a polymer comprising recurring units ($R_{PEEK}$) of formula (J-A), (J'-A) and/or (J"-A) and recurring units ($R^*_{PEEK}$) of formulas (J-D), (J'-D) or (J"-D) (also called hereby recurring units ($R_{PEDEK}$)). The PEEK-PEDEK copolymer may include relative molar proportions of recurring units ($R_{PEEK}$/$R_{PEDEK}$) ranging from 95/5 to 5/95, from 90/10 to 10/90, or from 85/15 to 15/85. The sum of recurring units ($R_{PEEK}$) and ($R_{PEDEK}$) can for example represent at least 60 mol. %, 70 mol. %, 80 mol. %, 90 mol. %, 95 mol. %, 99 mol. %, of recurring units in the PEEK copolymer. The sum of recurring units ($R_{PEEK}$) and ($R_{PEDEK}$) can also represent 100 mol. %, of recurring units in the PEEK copolymer.

PEEK is commercially available as KetaSpire® PEEK from Solvay Specialty Polymers USA, LLC.

According to one embodiment of the present disclosure, the PEEK polymer has a weight average molecular weight (Mw) ranging from 55,000 to 105,000 g/mol, for example from 65,000 to 85,000 g/mol, (as determined by gel permeation chromatography (GPC) using phenol and trichlorobenzene (1:1) at 160° C., with polystyrene standards).

In another embodiment, the PAEK is a poly(ether ketone ketone) (PEKK). The PEKK described in connection with polymers (P1) and (P2) may be distinct from PEKK1 and PEKK2 used to prepare the film bonding the two components of the assembly. Notably, this PEKK polymer may have a different T/I ratio. Polymers (P1) and (P2) may be the same or distinct PEKK themselves, for example PEKK having different T/I ratio.

More precisely, the poly(ether ketone ketone) (PEKK) which may be used as polymer(s) of the first and second components of the assembly actually denotes a polymer comprising more than 50 mol. % of the recurring units of formulas (J-$B_1$) and (J-$B_2$), the mol. % being based on the total number of moles of recurring units in the polymer:

(J-$B_1$)

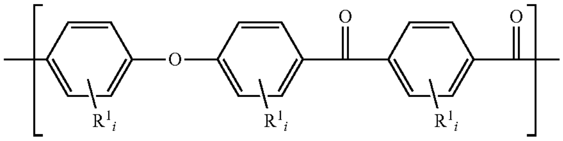

(J-$B_2$)

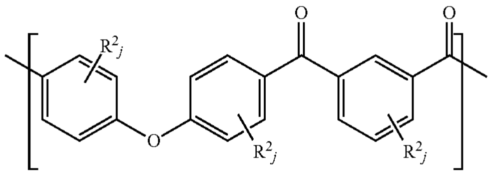

wherein $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i and j, at each instance, is an independently selected integer ranging from 0 to 4.

According to an embodiment, $R^1$ and $R^2$ are, at each location in formula (J-$B_2$) and (J-$B_1$) above, independently selected from the group consisting of a C1-C12 moiety, optionally comprising one or more than one heteroatoms; sulfonic acid and sulfonate groups; phosphonic acid and phosphonate groups; amine and quaternary ammonium groups.

According to another embodiment, i and j are zero for each $R^1$ and $R^2$ group. According to this embodiment, the PEKK polymer comprises at least 50 mol. % of recurring units of formulas (J'-$B_1$) and (J'-$B_2$), the mol. % being based on the total number of moles of recurring units in the polymer:

(J'-$B_1$)

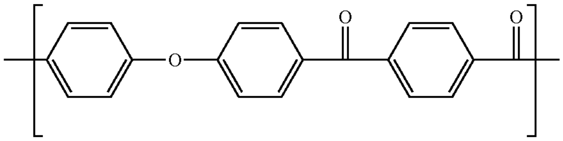

-continued (J'-$B_2$)

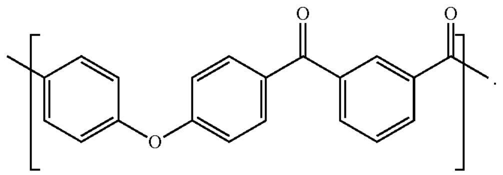

According to an embodiment of the present disclosure, at least 55 mol. %, at least 60 mol. %, at least 70 mol. %, at least 80 mol. %, at least 90 mol. %, at least 95 mol. %, at least 99 mol. % or all of the recurring units in the PEKK are recurring units of formulas (J-$B_1$) and (J-$B_2$).

In certain embodiments, polymer (P1) and polymer (P2) are independently selected from PEKK polymers as defined above (PEKK1, PEKK2) with a molar ratio of recurring units (J-$B_1$)/(J'-$B_1$) to recurring units (J-$B_2$)/(J'-$B_2$), also called T/I ratio, in the range from 55/45 to 85/15, preferably from 57/43 to 80/20, more preferably from 58/42 to 75/25.

In other embodiments, polymer (P1) and polymer (P2) may be independently selected from compositions comprising a first and a second PEKK polymer, each PEKK polymer being characterised by a T/I ratio, wherein the T/I ratio of the first PEKK polymer is different from T/I ratio of the second PEKK polymer, in particular those compositions having a melting temperature of less than or equal to 330° C. In an aspect of this embodiment, the first PEKK polymer preferably has a T/I ratio of a) at least 50/50, preferably of at least 54/46, more preferably of at least 56/44, most preferably of at least 57/43 and/or b) a T/I ratio of at most 64/36, preferably of at most 63/37, more preferably of at most 62/38. The second PEKK polymer preferably has a T/I ratio of a) at least 65/35, preferably of at least 66/34, more preferably of at least 67/33, and/or b) a T/I of at most 85/15, preferably of at most 83/17, more preferably of at most 82/18.

PEKK is notably commercially available as NovaSpire® PEKK from Solvay Specialty Polymers USA, LLC, or as Cypek® FC and Cypek® DS.

In one embodiment, the polymer(s) (P1) and/or (P2) is a nucleophilic PEKK, that-is-to-say a PEKK produced by polycondensation of monomers in the absence of a Lewis acid, wherein the monomers are di-hydroxy and di-fluoro benzoyl-containing aromatic compounds and/or of hydroxyl-fluoro benzoyl-containing aromatic compounds.

In an alternative embodiment, polymer PEKK is an electrophilic PEKK.

In another embodiment, the PAEK is a poly(ether ketone) (PEK). As used herein, the expression "poly(ether ketone)" and "polymer (PEK)" denotes any polymer of which more than 50 mol. % of the recurring units ($R_{PEK}$) are recurring units of formula (K'-C):

(K'-C)

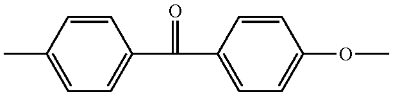

the mol. % being based on the total number of moles of recurring units in the PEK.

According to this embodiment, the PEK polymer may be such that at least 60 mol. %, at least 70 mol. %, at least 80 mol. %, at least mol. %, at least 95 mol. %, at least 99 mol. %, or even substantially all of the recurring units ($R_{PEK}$) are recurring units (K'-C). Preferred PEK polymers are those wherein substantially all recurring units are units of formula (K'-C), being understood that end-groups, defects and minor amounts of impurities may be present.

In some embodiments, the polymer (PAEK) is a poly (ether diphenyl ether ketone) (PEDEK). As used herein, the expression "poly(ether diphenyl ether ketone)" or "polymer (PEDEK)" denotes any polymer of which more than 50 mol. % of the recurring units ($R_K$) are recurring units of formula (K'-D):

(K'-D)

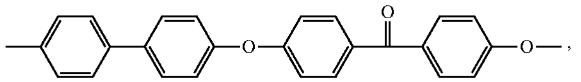

the mol. % being based on the total number of moles of recurring units in the PEDEK.

According to these embodiments, at least 60 mol. %, at least 70 mol. %, at least 80 mol. %, at least mol. %, at least 95 mol. %, at least 99 mol. %, or even substantially all recurring units ($R_K$) are recurring units (K'-D), as above detailed. Preferred PEDEK polymers are those wherein substantially all recurring units are units of formula (K'-D), being understood that end-groups, defects and minor amounts of impurities may be present.

In some embodiments, the first component of the assembly may comprise polymer (P1), as well as a filler. Said filler may include a fibrous filler or a non-fibrous filler. Said filler may include both a fibrous filler and a non-fibrous filler.

Additionally, or alternatively, the second component of the assembly may comprise polymer (P2), as well as a filler. Said filler may include a fibrous filler, or a non-fibrous filler. Said filler may include both a fibrous filler, and a non-fibrous filler.

According to a preferred embodiment, both the first and second components of the assembly comprise at least one filler, which may be the same or different. According to this embodiment, the film which is positioned between the first and second component may comprise itself a filler, which may be the same of different from the filler used in the first or second components of the assembly. Alternatively, the film which is positioned between the first and second component preferably does not comprise a filler (or comprise a filler in an amount of less than 1 wt. %, less than 0.5 wt. % or even less than 0.1 wt. % based on the total weight of the film).

Suitable fibrous fillers include, for example, carbon fibers, graphite fibers, glass fibers, such as E glass fibers, ceramic fibers such as silicon carbide fibers, synthetic polymer fibers such as aromatic polyamide fibers, polyimide fibers, high-modulus polyethylene (PE) fibers, polyester fibers and poly-benzoxazole fibers such as poly-p-phenylene-benzobisoxazole (PBO) fibers, aramid fibers, boron fibers, basalt fibers, quartz fibers, alumina fibers, zirconia fibers and mixtures thereof. Fibers may be continuous or discontinuous and may be aligned or randomly oriented.

In some embodiments, the fibers include at least one carbon fiber. As used herein, the term "carbon fiber" is intended to include graphitized, partially graphitized, and ungraphitized carbon reinforcing fibers, as well as mixtures thereof. The carbon fibers can be obtained by heat treatment and pyrolysis of different polymer precursors such as, for example, rayon, polyacrylonitrile (PAN), aromatic polyamide or phenolic resin; carbon fibers may also be obtained from pitchy materials. The term "graphite fiber" is intended to denote carbon fibers obtained by high temperature pyrolysis (over 2000° C.) of carbon fibers, wherein the carbon atoms place in a way similar to the graphite structure. The carbon fibers are preferably chosen from the group consisting of PAN-based carbon fibers, pitch based carbon fibers, graphite fibers, and mixtures thereof.

In some embodiments, the fibers include at least one glass fiber. Glass fibers may have a circular cross-section or a non-circular cross-section (such as an oval or rectangular cross-section). When the glass fibers used have a circular cross-section, they preferably have an average glass fiber diameter of 3 to 30 μm, with a particularly preferred average glass fiber diameter of 5 to 12 μm. Different types of glass fibers with a circular cross-section are available on the market depending on the type of the glass they are made of. One may notably cite glass fibers made from E- or S-glass. In some embodiments, the glass fiber is standard E-glass material with a non-circular cross section. In some embodiments, the first and second components of the assembly includes S glass fibers with a circular cross-section.

In an embodiment, the first and second components of the assembly of the present invention comprises continuous fibers. As referred to herein, "continuous fibers" refer to fibers having a length of greater than or equal to 3 mm, more typically greater than or equal to 10 mm and an aspect ratio of greater than or equal to 500, more typically greater than or equal to 5000.

In an embodiment of the invention, the first component is a composite material, also called laminate, comprising one or more layers, these layers for example comprising polymer (P1) and fibers. Polymer (P1) may for example be either impregnated, coated or laminated onto the fibers.

In further embodiment of the invention, the second component is a composite material, also called laminate, comprising one or more layers, these layers for example comprising fibers and polymer (P2). Polymer (P2) may for example be either impregnated, coated or laminated onto the fibers.

A second object of the invention is a method of making an assembly using the film as described above. The method comprises the steps of:

a) arranging the film between a first component comprising a polymer (P1) and a second component comprising a polymer (P2); and
b) subjecting the film to a temperature ($T_{m^x}$), wherein:

$$T_{m^x} \geq T_m, \quad (1)$$

$$T_{m^x} > T_m, \quad (2)$$

$$T_{m^x} > T_m + 5, \text{ or} \quad (3)$$

$$T_{m^x} > T_m + 10, \quad (4)$$

wherein $T_m$ is the melting temperature (° C.) of the film.

In other words, temperature ($T_{m^x}$) is a processing temperature which is suitable to melt the film. Temperature ($T_{m^x}$) is equals to and preferably higher than the melting temperature ($T_m$) of the film.

Temperature ($T_{m^x}$) may be lower than 360° C., preferably less than 350° C., more preferably less than 340° C. Temperature ($T_{m^x}$) may be higher than 270° C., for example higher than 275° C. Temperature ($T_{m^x}$) may be in the range 274° C. to 328° C., for example in the range 278° C. to 315° C.

According to some embodiments, the temperature ($T_{m^x}$) is lower than the melting temperature of polymer (P1) ($T_{m1}$) and/or lower than the melting temperature of polymer (P2) ($T_{m2}$):

$$T_{m^x} < T_{m1}, \text{ and/or} \quad (5)$$

$$T_{m^x} < T_{m2}. \quad (6)$$

wherein $T_{m1}$ and $T_{m2}$ are respectively the melting temperatures of the polymer (P1) and polymer (P2).

Advantageously, the temperature ($T_{m^x}$) is lower than both the melting temperatures of polymer (P1) ($T_{m1}$) and polymer (P2) ($T_{m2}$).

According to some embodiments:

$$T_{m^x} < T_{m1} - 5, \quad (7)$$

$$T_{m^x} < T_{m2} - 5, \quad (8)$$

$$T_{m^x} < T_{m1} - 10, \text{ and/or} \quad (9)$$

$$T_{m^x} < T_{m2} - 10. \quad (10)$$

In some preferred embodiments, whilst the film and the first and second components of the assembly are subjected to temperature ($T_{m^x}$), the method further comprises applying pressure, on the assembly in order to consolidate the assembly. In other words, the method preferably further comprises applying pressure to the first and second components, concomitantly to step b), subjecting the film to a temperature ($T_{m^x}$).

The method of the invention preferably further comprises a step c) consisting in a controlled cooling of the assembly. This additional step is advantageous in order to build crystallinity in the film. The film in the assembly preferably presents a crystallinity of at least 3%, preferably at least 5%, more preferably at least 15%, especially at least 20%, after cooling, crystallinity being measured as described in the examples below.

A third aspect of the invention relates to the use of the assembly described herein to prepare parts or articles to be used for various end-uses applications. Mention may be made of applications in the aerospace and automotive industries. For example, parts and articles comprising or consisting of the assembly of the present invention can include, but are not limited to, brackets, clips, stiffeners and other similar type parts.

The invention will be herein after illustrated in greater detail in the following section by means of non-limiting examples.

Should the disclosure of any patents, patent applications, and publications which are incorporated herein by reference conflict with the description of the present application to the extent that it may render a term unclear, the present description shall take precedence.

EXAMPLES

Raw Materials 1,2-dichlorobenzene, terephthaloyl chloride, isophthaloyl chloride, 3,5-dichlorobenzoylchloride, aluminum chloride ($AlCl_3$), methanol were purchased from Sigma Aldrich.

1,4-Bis(4-phenoxybenzoyl)benzene was prepared according to IN patent 193687 (filed on Jun. 21, 1999 and incorporated herein by reference).

Diphenyl sulfone (polymer grade) was procured from Proviron (99.8% pure). Sodium carbonate, light soda ash, was procured from Solvay S. A., France and dried before use. Its particle size was such that its $d_{90}$ was 130 µm.

Potassium carbonate with a $d_{90}$<45 µm was procured from Armand products and dried before use.

Lithium chloride (anhydrous powder) was procured from Acros.

$NaH_2PO_4.2H_2O$ and $Na_2HPO_4$ were purchased from Sigma-Aldrich.

1,4-bis(4'-fluorobenzoyl)benzene (1,4-DFDK) and 1,3 bis (4'-fluorobenzoyl)benzene (1,3-DFDK) were prepared by Friedel-Crafts acylation of fluorobenzene according to Example 1 of U.S. Pat. No. 5,300,693 to Gilb et al. (filed Nov. 25, 1992 and incorporated herein by reference in its entirety). Some of the 1,4-DFDK was purified as described in U.S. Pat. No. 5,300,693 by recrystallization in chlorobenzene, and some of the 1,4-DFDK was purified by recrystallization in DMSO/ethanol. The 1,4-DFDK purified by recrystallization in DMSO/ethanol was used as the 1,4-DFDK in the polymerization reactions to make PEKK described below, while 1,4-DFDK recrystallized in chlorobenzene was used as precursor for 1,4-bis(4'-hydroxybenzoyl)benzene (1,4-BHBB).

1,4-BHBB and 1,3-bis(4'-hydroxybenzoyl)benzene (1,3-BHBB) were produced by hydrolysis of the 1,4-DFDK, and 1,3-DFDK, respectively, following the procedure described in Example 1 of U.S. Pat. No. 5,250,738 to Hackenbruch et al. (filed Feb. 24, 1992 and incorporated herein by reference in its entirety). They were purified by recrystallization in DMF/ethanol. Boron nitride: Boronid® S1-SF, a hexagonal boron nitride grade available commercially from 3M Corporation Determination of the Glass Transition Temperature (Tg), Melting Temperature ($T_m$), Crystallization Temperature (Tc) and Heat of Fusion ($\Delta H_f$)

The glass transition temperature (Tg), melting temperature ($T_m$), crystallization temperature (Tc) and heat of fusion ($\Delta H_f$) were determined in differential scanning calorimeter (DSC) according to ASTM D3418, using a heating and cooling rate of 10° C./min.

$T_g$ (mid-point, using the half-height method), heat of fusion $\Delta H_f$ and $T_m$ (peak temperature of the melting endotherm) were determined on the $2^{nd}$ heat scan. $T_c$ was determined as the peak temperature of the crystallization exotherm on the $1^{st}$ cool scan.

The melting of the composition was taken as the area over a linear baseline drawn from 220° C. to a temperature above the last endotherm. When assessing the crystallinity of the film in the bonded structure (part), the heat of fusion was determined on the $1^{st}$ heat scan.

Details of the procedure are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were:

$1^{st}$ heat cycle: 30.00° C. to 400.00° C. at 10.00° C./min, isothermal at 400.00° C. for 1 min;

$1^{st}$ cool cycle: 400.00° C. to 30.00° C. at 10.00° C./min, isothermal for 1 min;

$2^{nd}$ heat cycle: 30.00° C. to 400.00° C. at 10.00° C./min, isothermal at 400.00° C. for 1 min.

Determination of the Melt Flow Index

The melt flow index was determined according to ASTM D1238 at the indicated temperature (340 to 380° C. depending on the melting point of the material) with a 3.8 kg weight. The final MFI for a 8.4 kg weight was obtained by multiplying the value obtained by 2.35.

SYNTHESIS EXAMPLES

PEKK #1 with T/I=71/29

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 112.50 g of diphenyl sulfone (DPS), 23.054 g of 1,3-BHBB, 16.695 g of 1,4-BHBB and 41.292 g of 1,4-DFDK. The flask content was evacuated under vacuum and then filled with high purity nitrogen (containing less than 10 ppm $O_2$). The reaction mixture was then placed under a constant nitrogen purge (60 mL/min). The reaction mixture was heated slowly to 270° C. At 270° C., 13.725 g of $Na_2CO_3$ and 0.078 g of $K_2CO_3$ was added via a powder dispenser to the reaction mixture over 60 minutes. At the end of the addition, the reaction mixture was heated to 310° C. at 1° C./minute. After 2 minutes at 310° C., 1.107 g of 1,4-DFDK were added to the reaction mixture while keeping a nitrogen purge on the reactor. After 5 minutes, 0.741 g of lithium chloride were added to the reaction mixture. 10 minutes later, another 0.402 g of 1,4-DFDK were added to the reactor and the reaction mixture was kept at temperature for 15 minutes. Another charge of 15 g of diphenyl sulfone was added to the reaction mixture, which was kept under agitation for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 0.67 g of $NaH_2PO_4.2H_2O$ and 0.62 g of $Na_2HPO_4$ were dissolved in 1200 mL DI water for the last wash. The powder was then removed from the reactor and dried at 120° C. under vacuum for 12 hours yielding 72 g of a yellow powder.

PEKK #2 with T/I=58/42

The same procedure as example 1 was followed with the amounts of reagents indicated in table 1 below.

TABLE 1

| Example | Quantities | #1 | #2 |
|---|---|---|---|
| T/I | | 71/29 | 58/42 |
| DPS | g | 112.50 | 112.50 |
| 1,3-BHBB | g | 23.054 | 33.389 |
| 1,4-BHBB | g | 16.695 | 6.360 |
| 1,4-DFDK | g | 41.292 | 41.292 |
| $Na_2CO_3$ | g | 13.725 | 13.725 |
| $K_2CO_3$ | g | 0.078 | 0.078 |
| 1,4-DFDK | g | 1.107 | 0.906 |
| LiCl | g | 0.741 | 0.953 |

TABLE 1-continued

| Example | Quantities | #1 | #2 |
|---|---|---|---|
| 1,4-DFDK | g | 0.402 | 0.402 |
| DPS | g | 15 | 40 |
| MFI | g/10 min | 100 | 33 |
| MFI Temp | ° C. | 360 | 340 |

TABLE 1'

| Example | Quantities | #1 | #2 |
|---|---|---|---|
| (M—OH) | mol | 0.072 | 0.105 |
| (P—OH) | mol | 0.052 | 0.020 |
| (M—OH) + (P—OH) | mol | 0.125 | 0.125 |
| (P—F) | mol | 0.125 | 0.125 |
| $Na_2CO_3 + K_2CO_3$ | mol | 0.130 | 0.130 |
| Molar ratio (P—F)/(M—OH) + (P—OH) | | 1 | 1 |
| Molar ratio (P—F) + (P—OH)/(M—OH) | | 2.45 | 1.38 |

Procedure for solution blending of PEKK Composition of Example 3

In a 500 mL 4-neck reaction flask fitted with a stirrer, a $N_2$ inlet tube, a Claisen adapter with a thermocouple plunging in the reaction medium, and a condenser were introduced 235.00 g of diphenyl sulfone (DPS), as well as boron nitride a nucleating agent (table 2). The flask content was heated slowly to 330° C. At 330° C., PEKK polymer powder #1 (5 g) and #2 (95 g) were slowly added via a flex tube into the molten DPS. At the end of the addition, the agitation speed was increased to provide good mixing and the mixture was held at 330° C. for another hour.

The reactor content was then poured from the reactor into a stainless steel pan and cooled. The solid was broken up and ground in an attrition mill through a 2 mm screen. Diphenyl sulfone was extracted from the mixture with acetone and water. 0.67 g of $NaH_2PO_4.2H_2O$ and 0.62 g of $Na_2HPO_4$ were dissolved in 1200 mL DI water for the last wash. The powder was then removed from the reactor and dried at 120° C. under vacuum for 12 hours yielding 90-95 g of a yellow powder.

TABLE 2

| Example | | 1c | 2c | 3 |
|---|---|---|---|---|
| Boron nitride | pph | 0 | 0 | 1.2 |
| PEKK #1 T/I = 71/29 | wt. % | 100 | | 5 |
| PEKK #2 T/I = 58/42 | wt. % | | 100 | 95 |

Thermal Properties

TABLE 3

| | $T_g$ ° C. | $T_m$ ° C. | $T_c$ ° C. | Measured ΔHf J/g | Minimal ΔHf (eq 1) J/g | Meets eq 1? |
|---|---|---|---|---|---|---|
| 1c | 160 | 346 | 304 | 49 | 105 | no |
| 2c | 159 | 297 | 217 | 22 | 22 | no |
| 3 | 159 | 302 | 247 | 33 | 30 | yes |

As shown by data collected above (Table 3), the PEKK composition of example 3 (according to the invention)

present an improved crystallization and crystallinity as compared to the PEKK compositions of examples 1-2.

The measured enthalpy of fusion ΔHf of the PEKK composition of example 3 is higher than the minimal ΔHf, as calculated per equation 1 below, which means that PEKK composition of example 3 meets the following equation:

$$\Delta H_f > 1.69 \times T_m - 480 \quad \text{(eq 1)}$$

wherein:

$T_m$ is the melting point in ° C. and $\Delta H_f$ is in J/g

The PEKK composition of example 3, according to the invention, therefore presents a set of properties:

a melting point $T_m \leq 310°$ C.;

a heat of fusion $\Delta H_f > 5$ J/g; and a $\Delta H_f$ meeting equation 1, which makes it well-suited to be processed into a film to be used in a laminate structure.

As far as the comparative examples are concerned:

PEKK #1 with a T/I ratio equals to 71/29 presents too high a Tm, which is higher than 340° C., and does not meet equation 1; and PEKK #2 with a T/I ratio equals to 58/42 does not meet equation 1 as its measured heat of fusion $\Delta H_f$ equals the minimal the heat of fusion $\Delta H_f$ as calculated in equation 1.

Preparation of the Blend Composition of Example 4

The polymer blend composition of this example consisted of: 93.8 wt. % of the n-PEKK #2, 5.0 wt. % of the n-PEKK #1 and 1.2 wt. % boron nitride. It was prepared by melt compounding using a 26 mm Coperion® (model ZSK-26) co-rotating partially intermeshing twin screw extruder having an L/D ratio of 48:1. The two PEKK resins in coarse powder form and the boron nitride nucleating agent, in a fine powder form, were first tumble blended for 20 minutes to form a physical pre-blend. The pre-blend was then fed gravimetrically at a rate of 35 lbs/hr (15.9 kg/hr) into the feed hopper at barrel section 1 of the extruder. The extruder had 12 barrel sections with barrel sections 2 through 12, as well as the die, being heated with a temperature profile setting of 350° C. throughout. The melt temperature for the extrudate was measured by a handheld pyrometer as it exited the die. The extrudate melt temperature was approximately 385° C. throughout the compounding run. The screw speed was set at 200 rpm, and, the resulting torque reading for the extruder was at approximately 55% throughout the production run. Vacuum venting with a vacuum level 26 in Hg was applied at barrel section 10 during compounding to strip off moisture and any possible residual volatiles from the compound. The extrudate from the run was stranded and cooled in a water trough and then pelletized into pellets approximately 2.7 mm in diameter and 3.0 mm in length.

PEKK #3 With a T/I Ratio of 60/40 (Comparative)

In a 2000 mL 4-neck reaction flask fitted with a stirrer, a dry $N_2$ inlet tube, a thermocouple plunging in the reaction medium, and a condenser were introduced 1000 g 1,2-dichlorobenzene and 65 g 1,4-Bis(4-phenoxybenzoyl)benzene. Under a sweep of dry nitrogen, 5.4 g of terephthaloyl chloride, 22.2 g of isophthaloyl chloride and 0.2 g of benzoyl chloride were then added to the reaction mixture. The reactor was then cooled to −5° C. and 115 g of aluminium chloride ($AlCl_3$) were added slowly while keeping the temperature below 5° C. The reaction was held at 5° C. for 10 minutes then the temperature of the mixture was increased to 90° C. at 5° C./minute. The reaction mixture was held at 90° C. for 30 minutes then cooled down to 30° C. At 30° C., 250 g of methanol were added slowly to maintain the temperature below 60° C. After the end of the addition, the reaction mixture was kept under agitation for 2 hours then cooled down to 30° C. The solid was then removed by filtration on a Büchner. The wet cake was rinsed on the filter with an additional 188 g of methanol. The wet cake was then re-slurried in a beaker with 440 g of methanol for 2 hours. The polymer solid was filtered again on Büchner funnel and the wet cake was rinsed on the filter with 188 g of methanol. The solid was slurried with 470 g of an aqueous hydrochloric acid solution (3.5 wt %) for 2 hours. The solid was then removed by filtration on a Büchner. The wet cake was rinsed on the filter with an additional 280 g of water. The wet cake was then re-slurried in a beaker with 250 g of 0.5N sodium hydroxide aqueous solution for 2 hours. The wet cake was then re-slurried in a beaker with 475 g of water and filtered on Büchner funnel. The last water washing step was repeated 3 more times. The polymer is then slurried with 0.75 g of an aqueous solution containing 6.6 wt % of $NaH_2PO_4.2H_2O$ and 3.3 wt % of $Na_2HPO_4$. then dried in a vacuum oven at 180° C. for 12 hours. The melt flow index (360° C., 8.4 kg) was 82. g/10 min. The PEKK had the following features:

MFI: 33 g/10 min

MFI Temperature: 360° C.

Al content: >10 ppm (25 ppm)

F content: <100 ppm

TABLE 4

| Example | | 4 | 5c |
|---|---|---|---|
| Boron nitride | wt. % | 1.2 | 0 |
| PEKK #1 T/I = 71/29 | wt. % | 5 | 0 |
| PEKK #2 T/I = 58/42 | wt. % | 93.8 | 0 |
| PEKK #3 T/I = 60/40 | wt. % | 0 | 100 |

Extrusion of Binder Film From the Composition of Example 4 and 5c

The compounded pellets were processed into a film having a nominal thickness of 140 μm and a width of 8.5 to 9 cm using melt extrusion on a single screw extruder. An OCS (Optical Control Systems, GmbH) extruder was used for this purpose. The extruder had a single stage non-vented screw with a diameter of 20 mm and an L/D ratio of 30. It was equipped with a film die 125 mm wide having a 0.5 mm gap thickness. The extruder barrel had four heated sections which were operated from rear to front at temperature settings of approximately: 335, 345, 345 and 350° C., respectively. The film die was set at a temperature of 360° C. Before extrusion into film, the pellets were dried overnight (about 16 hours) in a desiccated air convection oven set at 150° C. The blend was extruded using a screw speed of 36 rpm and a throughput rate of about 5 lb/hr (2.3 kg/hr). The film was formed and drawn down on two chill rolls, set at 155 and 160° C., for the first (top) and second (bottom) roll, respectively.

Preparation of Assemblies and Fracture Toughness Tests

Materials

APC (PEKK-FC)/AS4D commercially available from Solvay

Fiberglass fabric style 108 commercially available from BGF

Kapton® films (51 mm), commercially available from Solvay

Procedure

Assemblies (also called laminates) of 305 mm×305 mm size in which the layer in the crack plane is the PEKK film were made as follows:

APC (PEKK FC)/AS4D unitape with a nominal fiber areal weight=145 gsm and resin content of 34 wt. % was cut and stacked to make a 16 ply quasi-isotropic orientation (+45°/90°/−45°/0°02s lay-up).

On top of that lay-up stack, 1 ply of style 108 fiberglass fabric is placed covering the entire surface, On top of the fiberglass fabric, was placed the 280 mm×305 mm×0.125 mm PEKK film (Example 4 or 5c) with three of the edges aligned with the edges of the lay-up. The other edge will have a 305 mm×25 mm×0.05 mm thick release coated Kapton® film that was the crack starter once the panel was consolidated.

The reminder of the lay-up is to reverse the order of the material placed starting with style 108 fiberglass fabric followed by 16 ply quasi-isotropic.

The lay-up should be symmetric at the mid-plane. The lay-up was then placed on a flat steel tool and vacuum bagged (710-730 mm Hg vacuum) to be processed in a high temperature autoclave. The autoclave cycle was a straight temperature ramp to 375 C at which point 6.7 bars of pressure was applied and held for 15 minutes before cooling the lay-up down while under 6.7 bar pressure and 711 mm Hg. The pressure was released at 93° C. and cooled down to room temperature before removing from the autoclave. The resulting panels were measured for thickness and then machined into 1"×12" test coupons to conduct G1c fracture toughness measurements.

TABLE 5

| Example | Lay-up | G1c (J/m$^2$) |
|---|---|---|
| 4 | [45/90/−45/0]2 s/108glass/PEKK film/108glass/[45/90/−45/0]2 s | 1563 |
| 5c | Same as above | 2021 |

The data shows that the use of a film according to the invention (example 4) provides a binding of the same order of magnitude than a film made of PEKK 60/40 (Table 5). In addition, the PEKK formulation according to the invention presents a higher crystallinity for the same Tm (Table 3), which is key for chemical resistance and higher temperature capability.

The invention claimed is:

1. An assembly comprising:

a first component comprising a polymer (P1), a second component comprising a polymer (P2) and a film positioned between and bonded to the first component and the second component, wherein the film comprises a blend of at least two poly(ether ketone ketone) (PEKK) polymers (PEKK1, PEKK2), wherein the PEKK polymers comprise at least 50 mol. % of recurring units of formulas (M) and (P), the mol. % being based on the total number of moles in the polymer:

(P)

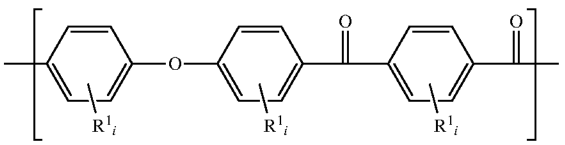

(M)

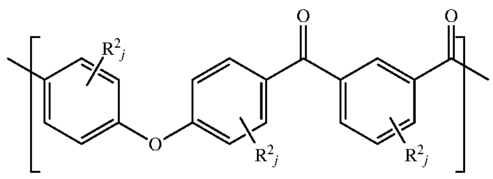

wherein $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

i and j, at each instance, are independently selected integers ranging from 0 to 4; wherein the PEKK1 and PEKK2 differ from each other in that they have distinct molar ratios T/I of recurring units (P) to recurring units (M); and wherein the film has a processing temperature ($T_{mx}$) which is suitable to melt the film, and wherein ($T_{mx}$) is lower than a melting temperature ($T_{m1}$) of polymer (P1) and a melting temperature ($T_{m2}$) of polymer (P2).

2. The assembly of claim 1 wherein i and j are zero for each $R^1$ and $R^2$ group.

3. The assembly of claim 1 wherein:

at least 95 mol. %; or at least 99 mol. %;

in at least one of the PEKK polymers (PEKK1, PEKK2) are recurring units of formulae (M) and (P).

4. The assembly of claim 1 wherein the T/I molar ratio of PEKK1 is between 50/50 and 64/36; and/or the T/I molar ratio of PEKK2 is between 65/35 and 85/15.

5. The assembly of claim 1, wherein a weight ratio PEKK1/PEKK2 is between 65/35 and 99/1.

6. The assembly of claim 1 wherein the blend of the PEKK polymers (PEKK1, PEKK2) has a melt temperature Tm ranging from 270 to 340° C. as measured by differential scanning calorimetry (DSC) according to ASTM D3418.

7. The assembly of claim 1 wherein the PEKK polymer blend is such that heat of fusion AHf of the blend meets the following equation:

$$\Delta H_f > 1.69 \times T_m - 480 \quad \text{(eq 1)}$$

wherein:

Tm is the melting temperature of the blend in° C. and $\Delta H_f$ is in J/g.

8. The assembly of claim 1 wherein the heat of fusion ΔHf of the blend is at least 5.0 J/g.

9. The assembly of claim 1, wherein the film further comprises at least one nucleating agent selected from the group consisting of boron-containing compounds, alkaline earth metal carbonates, oxides, silicates, salts of alkaline earth metals, nitrides and carbon-based compounds.

10. The assembly of claim 1, wherein at least one of the PEKK polymers of the film is such that it has been manufactured in a solvent in the absence of a Lewis acid or in the presence of an amount of Lewis acid of less than 2 wt. %, based on the total weight of the monomers.

11. The assembly of claim 1, wherein PEKK1 and PEKK2 each contain polymer-bound fluorine in an amount higher than 100 ppm.

12. The assembly of claim 1, wherein an amount of Al in PEKK1 and in PEKK2 is below 50 ppm.

13. The assembly of claim 1, wherein PEKK1 and PEKK2 exhibit a Td (1%) of at least 500° C. as measured by thermal gravimetric analysis according to ASTM D3850, with a heating from 30° C. to 800° C. under nitrogen using a heating rate of 10° C./min.

14. The assembly of claim 1, wherein the film has a thickness ranging from 15 to 800 μm.

15. The assembly of claim 1, wherein polymer (P1) and polymer (P2) are independently selected from the group consisting of poly(aryl ether ketones) (PAEK), poly(etherimides) (PEI), poly(amide imides) (PAI), poly(aryl ether sulfones) (PAES), poly(arylene sulphides) (PAS), poly(phthalamides) (PPA), polyamides (PA), polycarbonates (PC), liquid crystal polymers (LCP), poly(aromatic esters) (PAE) and blends thereof.

16. The assembly of claim 1, wherein polymer (P1) and/or polymer (P2) are independently selected from the group consisting of PEEK and PEKK, wherein: PEEK denotes any polymer comprising at least 10 mol. % of the recurring units are recurring units ($R^{PEEK}$) of formula (J"-A):

(J"-A)

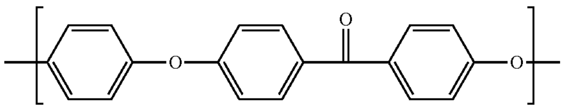

the mol. % being based on the total number of moles of recurring units in the polymer and PEKK denotes any polymer comprising at least 50 mol. % of recurring units of formulas (J'-$B_1$) and (J'-$B_2$), the mol. % being based on the total number of moles of recurring units in the polymer:

(J'-$B_1$)

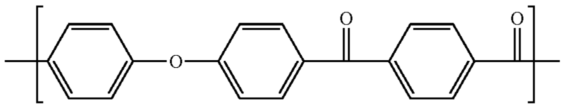

(J'-$B_2$)

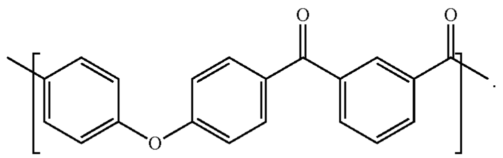

17. The assembly of claim 1, wherein polymer (P1) and polymer (P2) are independently selected from PEKKs polymer with a T/I ratio in the range from 55/45 to 85/15.

18. The assembly of claim 1, wherein:

the first component is a composite material comprising one or more layers comprising fibers and polymer (P1), the second component is a composite material comprising one or more layers comprising fibers and polymer (P2), and/or the film comprises at least one scrim, nonwoven or lightweight fabric.

19. A method of making the assembly of claim 1, which comprises the steps of:

arranging the film between a first component comprising a polymer (P1) and a second component comprising a polymer (P2); and subjecting the film to a temperature (TmX), suitable to melt the film but not to melt polymer (P1) and polymer (P2).

20. The method of claim 19, wherein, whilst the film is being subjected to said temperature ($T_m^x$), pressure is applied to consolidate film components.

* * * * *